United States Patent
Van Moss, Jr.

[11] 3,888,187
[45] June 10, 1975

[54] DAMPENED AXLE BEARING MOUNTING

[76] Inventor: John H. Van Moss, Jr., 3 Manor Lane, Highland Park, Ill. 60035

[22] Filed: Dec. 3, 1973

[21] Appl. No.: 421,404

[52] U.S. Cl............ 105/224.1; 105/221 K; 105/223; 295/36 A; 308/180
[51] Int. Cl......... B61f 5/30; B61f 5/38; B61f 15/12
[58] Field of Search......... 105/218 R, 224.1, 221 K, 105/223; 295/36; 308/180

[56] References Cited
UNITED STATES PATENTS

| | | | |
|---|---|---|---|
| 2,282,161 | 5/1942 | Brauer | 105/224.1 X |
| 2,410,402 | 11/1946 | Ledwinka | 105/224.1 |
| 3,274,955 | 9/1966 | Thomas | 105/224.1 |
| 3,638,582 | 2/1972 | Beebe | 105/224.1 |
| 3,741,603 | 6/1973 | McLean, Jr. | 105/218 R X |

*Primary Examiner*—Lloyd L. King
*Assistant Examiner*—Howard Beltran
*Attorney, Agent, or Firm*—Rummler & Snow

[57] ABSTRACT

A railroad truck roller bearing journal stop of polyurethane plastic structure having a high internal damping and a resilience for center-guiding and cushioning and preventing excessive banging of the axle against the journal stops during freight car impacts and braking applications.

4 Claims, 8 Drawing Figures

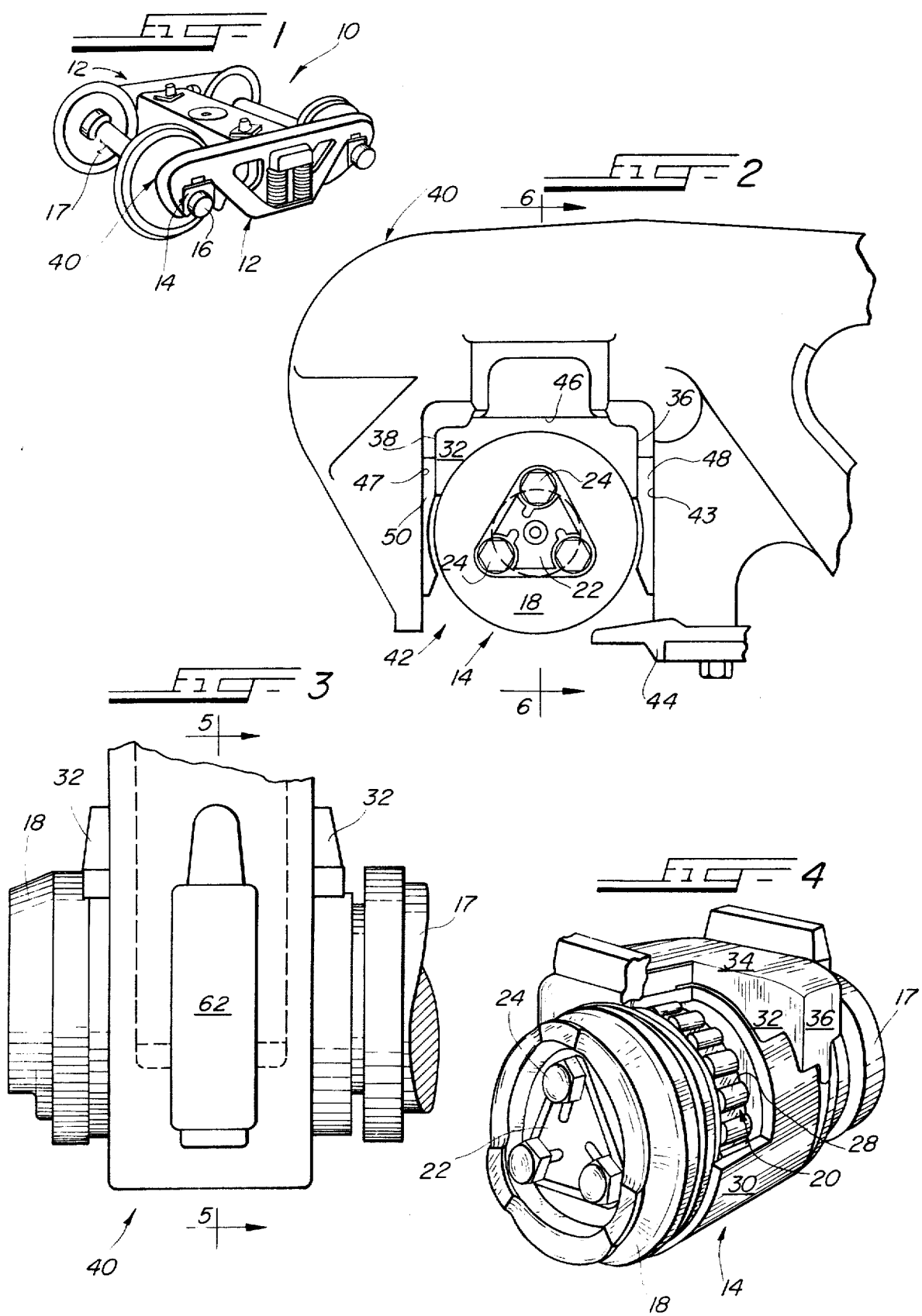

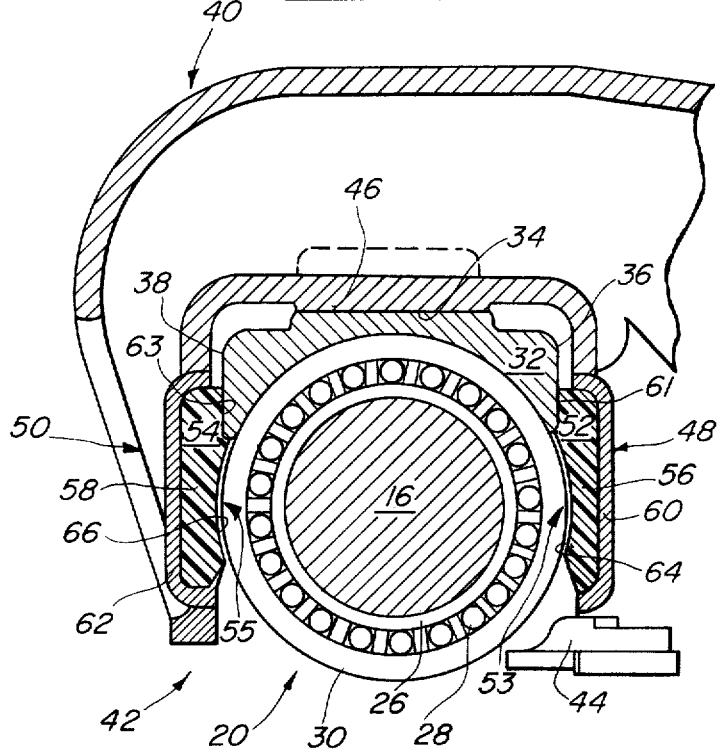
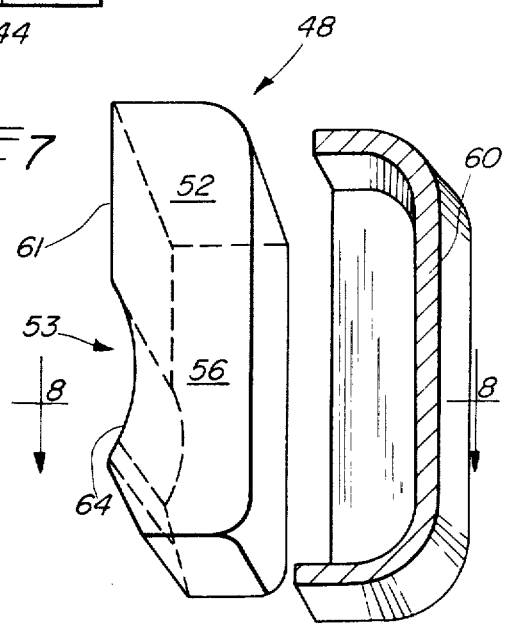
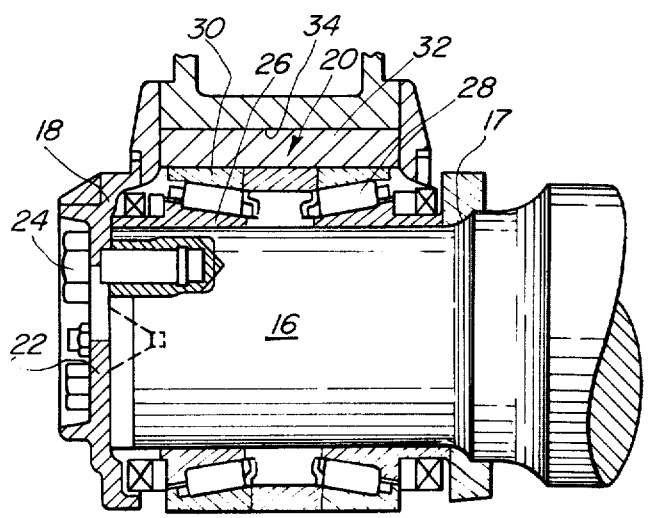
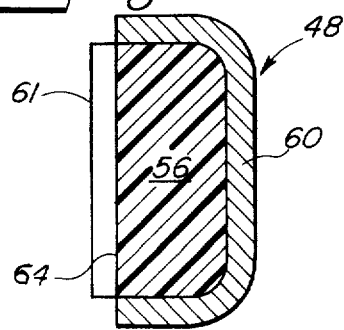

DAMPENED AXLE BEARING MOUNTING

BACKGROUND OF THE INVENTION

As early as 1831, the four-wheel truck was introduced on the American railway scene. The four-wheel arrangement makes possible a low truck structure, a feature most important in preventing the development of harmonic car body motion and in stabilizing trucks.

The railroad car wheel and axle assembly constitutes a highly-stressed mechanical system. The wheel must not only support its share of the car weight but must also, by action of its flange, serve to steer the vehicle along the rail. Because rigid mounting of the wheels and axles in the trucks would result in severe rolling-induced stresses and wear in the car suspension system and because of the fragile nature of many commodities transported in freight cars, the car-supporting bolster is sprung on truck side frames for isolation of road shock in the vertical and longitudinal directions. However, even with shock isolation systems, fore-and-aft forces from car braking and coupling can result in excessive displacement of the axle in the fore-and-aft direction and stabilizing means are needed to prevent excessive banging of the axle against the journal stops from car impacts and braking applications.

In the past full-floating journal assemblies have been proposed which provide for a cushioning connection between the axle and the car in the direction of the vertical as well as along the longitudinal for centering of the axle in the direction of the rail. The result has been an undesirable coupling of vertically induced shaking forces of the car body from longitudinal impact displacements of the axle.

In recent years, it has been shown that the stabilization of roller bearing journals has increased the life of railroad car journal bearings and resulted in less moving damage to fragile commodities carried in freight cars. Well-known devices which can be economically applied to A.A.R. journal boxes for stabilizing axles are the journal centering guide and the bronze R-S journal stop. Journal centering guides stabilize the roller bearing journal by the resilient supporting of the flat back roller bearing adapter against the pedestal and the journal stop by the bronze R-S journal stop limiting the journal movement against a stop. The resilient support given to roller bearing adapters and railroad axles is especially critical on some of the high cubic capacity cars with long coupler overhang under normal operating conditions. The stop is only important under extreme car operating conditions during coupling and braking.

Service experience has clearly demonstrated that under normal operating conditions, roller bearing adapters must, if possible, be constrained by center-guiding in fore-and-aft displacement under impact and braking by resilient means having high internal damping capacity which will isolate these forces by conversion of the dynamic energy to heat over a broad elastic displacement without contacting limiting stops. It is thus necessary to dampen the axle movement keeping it within the displacement limits of the mechanical stops during normal operation if the rated life of the bearing and low moving damage to fragile commodities is to be realized. Impact of the journal against mechanical stops from excessive displacement can be move damaging than displacement from normal braking or coupling. It is not enough to suddenly stop the axle within maximum specified dynamic displacement limits by impact against bronze journal stops. The axle must be cushioned in its impact against a resilient means having high internal damping capacity which will reduce these forces and dissipate their dynamic energy in heat.

There is thus an established need for a means of selectively stabilizing the fore-and-aft dynamic displacement of a roller bearing mounted on a railroad journal subject to impact and braking forces without inducing unwanted vertical shaking forces by a composite resilient damping device which allows free rotation of the axle during normal operation and yet cushions the energy of excessive fore and aft impact and braking with a minimum of wear and tear on parts.

SUMMARY OF THE INVENTION

The gist of this invention lies in the use of resilient polyurethane having high internal damping characteristic for resilient support of a roller bearing mounted A.A.R. standard railroad truck assembly and to dampen and snub the fore-and-aft dynamic displacement of the axle support assembly during car coupling and braking operations of the car. A modified pedestal-type side-frame is adapted to include polyurethane pads for this purpose fore and aft. Resilient support of the roller bearing for limiting axle displacement under normal impact and braking operations and snubbing support for cushioning the same from excessive displacement are each obtained by straddling the axle roller bearing adapter assembly at fore-and-aft locations between the jaws of the pedestal on the side frame of the truck with resilient pads having an interference fit with a retainer mounted on the pedestal for the first case and with snubber pads having a working clearance fit with the same. The pads are made of polyurethane material having a hardness of 60 to 90 Shore on the D-Scale and a high internal damping capacity. The adapter is vertically restrained to slide in a horizontal direction only relative to the pedestal on a flat-back bearing assembly.

BRIEF DESCRIPTION OF THE DRAWINGS

FIG. 1 is a perspective view of a roller bearing installation on the wheel axle in an A.A.R. standard freight car truck;

FIG. 2 is a fragmentary side view of an A.A.R. jaw and pedestal assembly modified for a roller bearing snubber installation;

FIG. 3 is a fragmentary front view of an A.A.R. jaw and pedestal assembly modified for a roller bearing snubber installation;

FIG. 4 is a fragmentary perspective view of a roller bearing mounting a flat-back adapter for use in a roller bearing snubber installation;

FIG. 5 is a fragmentary cross-sectional side view of the modified A.A.R. jaw and pedestal assembly taken along the lines 6—6 of FIG. 2;

FIG. 6 is a fragmentary cross-sectional view of the modified A.A.R. jaw and pedestal assembly taken along the lines 6—6 of FIG. 2;

FIG. 7 is an exploded fragmentary cross-sectional perspective view of the pad and retainer taken along the lines 5—5 of FIG. 3; and FIG. 8 is an assembled cross-sectional view of the pad and retainer taken along the lines 8—8 of FIG. 7.

DETAILED DESCRIPTION OF THE DRAWING

FIG. 1 discloses a four-wheel railroad truck 10 having side-frames 12 which mount roller bearing assemblies 14 which are mounted on journal ends 16 of axle 17. Only one assembly is referred to herein and each end of both axles will contain identical parts. End cap 18 secures roller bearing 20 to journal shaft 16 against shoulder 17 thereon, as shown in FIG. 6. Locking plate 22 secures the end cap 18 to the end of journal 16 by cap screws 24. Roller bearing 20 is comprised of an inner race 26 which slip fits around and is in concentric relation with journal 16, a roller cage assembly 28 which rolls around in concentric relation with inner race 26, and an outer race 30 which rolls around in concentric relation on roller cage assembly 28, as shown in FIGS. 4, 5 and 6. The inner race 26 is secured to the axle 16 in the usual manner. Roller bearing adapter 32 has a concave under side with a diameter equal to or slightly greater than that of the outer diameter and with a width slightly less than that of outer race 30 of roller bearing 20 and fits against the outer surface thereof. Flat-back bearing 34 is horizontally disposed on the top of the adapter 32 midway between the sides of outer race 30 of bearing 20. Front bearing face 36 and back bearing face 38 of adapter 32 are each disposed vertically and in fore-and-aft relation with respect to the flatback bearing 34 and are spaced over and above and at a width slightly less than that of the outer race 30 of the bearing 20. The flat-back bearing 34 carries its proportional share of the weight of the car.

Reference is made to FIGS. 2 and 5 showing the usual pedestal 40 having a jaw 42 with a front side 43 and a rear side 47 and a side-frame key 44 mounted on the bottom end of side 43 extending thereover to retain the roller bearing assembly 14 therein. A flat bearing surface 46 which is an integral part of pedestal 40 extends across the top of the jaw 42 in horizontal relation therewith and slidably supports bearing 34 on the top of the adapter 32 to give freedom of movement of the axle 17 in the fore-and-aft directions and automatic self-alignment of the axles 17 as the truck 10 proceeds down the track.

The present invention relates to front and back axle retainer pad assemblies 48 and 50 which comprise pads 53 and 55 of polyurethane having a hardness of 50 to 90 Shore D Scale having resilient support portions 52 and 54, respectively, and stop portions 56 and 58 which are assembled in pad retainers 60 and 62. The retainers are welded to the front and rear sides 43 and 47, respectively, of jaw 42. A front flat face 61 forms the resilient support portion 52 of the front pad 53 which is exposed toward the interior of jaw 42, as shown in FIGS. 7 and 8, and extends downward from the top surface of the pad 53 about one-third the length thereof in parallel relation with the front end bearing face 36 of the adapter 32 and having a thickness such that when it is assembled in the pad retainer 60 with the roller bearing assembly 14 therein and including the adapter 32, the flat face 61 and the front end bearing face 36 on the adapter 32 are in an interference fit relationship with each other so that the flat face 61 and the front end bearing face 36 are always in positive contact regardless of the fore-and-aft movement of the axle 16 as the truck 10 proceeds down the track. A similar back flat face 63 forms the resilient support portion 54 in the same manner on the back pad 55.

A front saddle face 64 forms the stop portion 56 of the front pad 53 which also is exposed toward the interior of jaw 42, as shown in FIG. 5, and extends downward from the top surface of the pad 53 the remaining two-thirds length thereof in concentric relation with the outer diameter of the outer race 30 of the roller bearing 20. The front pad 53 has a thickness at the saddle 64 such that when it is assembled in the front retainer 60 in the jaw 42 and the back pad 55 is assembled in the back retainer 62 with the roller bearing assembly 14 therebetween, the front saddle face 64 and the front end of the outer diameter of the outer race 30 of the bearing 20 are spaced a positive working clearance fit relationship in the fore-and-aft direction relative to each other so that the front saddle face 64 and the front end of the outer diameter of the outer face 30 of the roller bearing 20 are not in contact under normal operation but when excessive car impact and braking is incurred, the saddle face 64 acts as a stop to the axle 16 in its fore-and-aft movement relative to the jaws 42 of the pedestal 40 as the truck 10 proceeds down the track. A similar back saddle face 66 forms the stop portion 58 of the back pad 55.

It will be understood that details of the construction shown may be altered or omitted without departing from the spirit of the invention as defined by the following claims.

I claim:

1. In a railroad car truck side frame assembly mounting standard axles in anti-friction bearings with adaptors the combination for improvement in axle suspension comprising:
   a. a flat-back bearing mounted in a central position relative to the axle on top of the adaptor for sliding in the longitudinal direction on a horizontal plane mounted on the side frame,
   b. a resilient axle centering means mounted between and in abutting contact with both the side frame and the adaptor and horizontally disposed in spaced relation to the axle, and
   c. an axle snubbing means damping movement of the axle mounted between the side frame and the outer race of the anti-friction bearing.

2. In the resilient axle centering means, as set forth in claim 1, comprising:
   a. front and back bearing faces mounted in vertical relation on the adaptor located to each side of the axle,
   b. front and back pad retainers mounted in vertical relation on the side frame located to each side of the axle adjacent to and spaced horizontally from the adaptor bearing faces, and
   c. resilient pads each having a thickness greater than the horizontal space between the pad retainers and the bearing faces.

3. In the axle snubbing means, as set forth in claim 1, comprising:
   a. front and back bearing faces mounted in vertical relation on the outer race of the anti-friction bearings,
   b. front and back pad retainers mounted in vertical relation on the side frame located to each side of the outer race of the anti-friction bearings adjacent to and spaced horizontally from the outer race bearing faces, and c. snubbing pads each having a thickness less than the horizontal space between the pad retainers and the bearing face.

4. A four-wheel railroad truck having two side frames and two axles, roller bearing assemblies rotatably mounted at the end of each axle, end caps securing the roller bearings to the axles against a shoulder thereon, a locking plate securing the end cap to the end of the axle by cap screws, said roller bearing assembly comprising an inner race slip fitting around and in concentric relation with the axle, a roller cage assembly rolling around and in concentric relation with the inner race, an outer race rolling around in concentric relation with the roller cage assembly, a roller bearing adapter having a concave under side with a diameter equal to or slightly greater than that of the outer diameter of the outer race of the roller bearing assembly and with a width slightly less than that of the outer race fitting against the outer race thereof, a flat-back bearing surface horizontally disposed on the top of the adapter generally in a vertical relation above the center of the axle, a front bearing face and a back bearing face on the adapter disposed vertically below and in a fore-and-aft relation with respect to the flat-back bearing spaced thereabove having a width slightly less than that of the outer race of the roller bearing assembly, said side frame comprising a jaw having a front side and a rear side and a side-frame key mounted on the bottom end of the front side thereof and extending thereover to retain the roller bearing assembly and axle therein, a flat bearing surfaces integrally a part of the side frame extending across the top of the jaw in horizontal relation therewith and slidably supporting the flat back bearing on the top of the adapter, a front and back axle center guide and stop retainer pad assembly comprising pads having resilient support portions and stop portions assembled therein, said resilient support portions of the front and back pads extend downward from the top surface of the front and back pads in parallel abutting relation with the front and back end bearing faces of the adapter about one-third the length thereof, and having a thickness such that upon assembly therein, including the adapter, the front and back flat faces and the front and back end bearing faces on the adapter, an interference fit relationship results, and said front and back saddle faces forming the stop portions of the front and back pads extending downward from the top surface of the front pad the remaining two-thirds the length thereof in concentric spaced relation with the outer diameter of the outer race of the roller bearing assembly, the front saddle face and the front end of the outer diameter of the outer race of the roller bearing assembly and the back saddle face and the back end of the outer diameter of the outer race of the roller bearing assembly being spaced a working clearance relationship in the fore-and-aft direction relative to each other.

* * * * *